June 17, 1930.  F. G. HOBART  1,764,722
OIL FILTER
Filed July 9, 1926   2 Sheets-Sheet 2

INVENTOR
FRANKLIN G. HOBART
BY Roy M. Eilers
ATTORNEY

Patented June 17, 1930

1,764,722

UNITED STATES PATENT OFFICE

FRANKLIN G. HOBART, OF BELOIT, WISCONSIN, ASSIGNOR TO FAIRBANKS, MORSE & CO., OF CHICAGO, ILLINOIS, A CORPORATION OF ILLINOIS

OIL FILTER

Application filed July 9, 1926. Serial No. 121,413.

My invention relates to improvements in oil filters and more particularly to filters of the continuous type.

The object of my invention is to provide a filter which is efficient and positive in operation, quickly and easily repaired and cleaned and one which is economical to manufacture.

Further objects and advantages of my invention will appear from the following drawings and description thereof.

Although my invention consists largely in the construction and arrangement of parts hereinafter described and particularly pointed out in the claims, yet I do not limit my invention to the precise form, construction or arrangement of parts shown or the several parts thereof, inasmuch as various alterations may be made without changing the scope of my invention.

Figure 1:
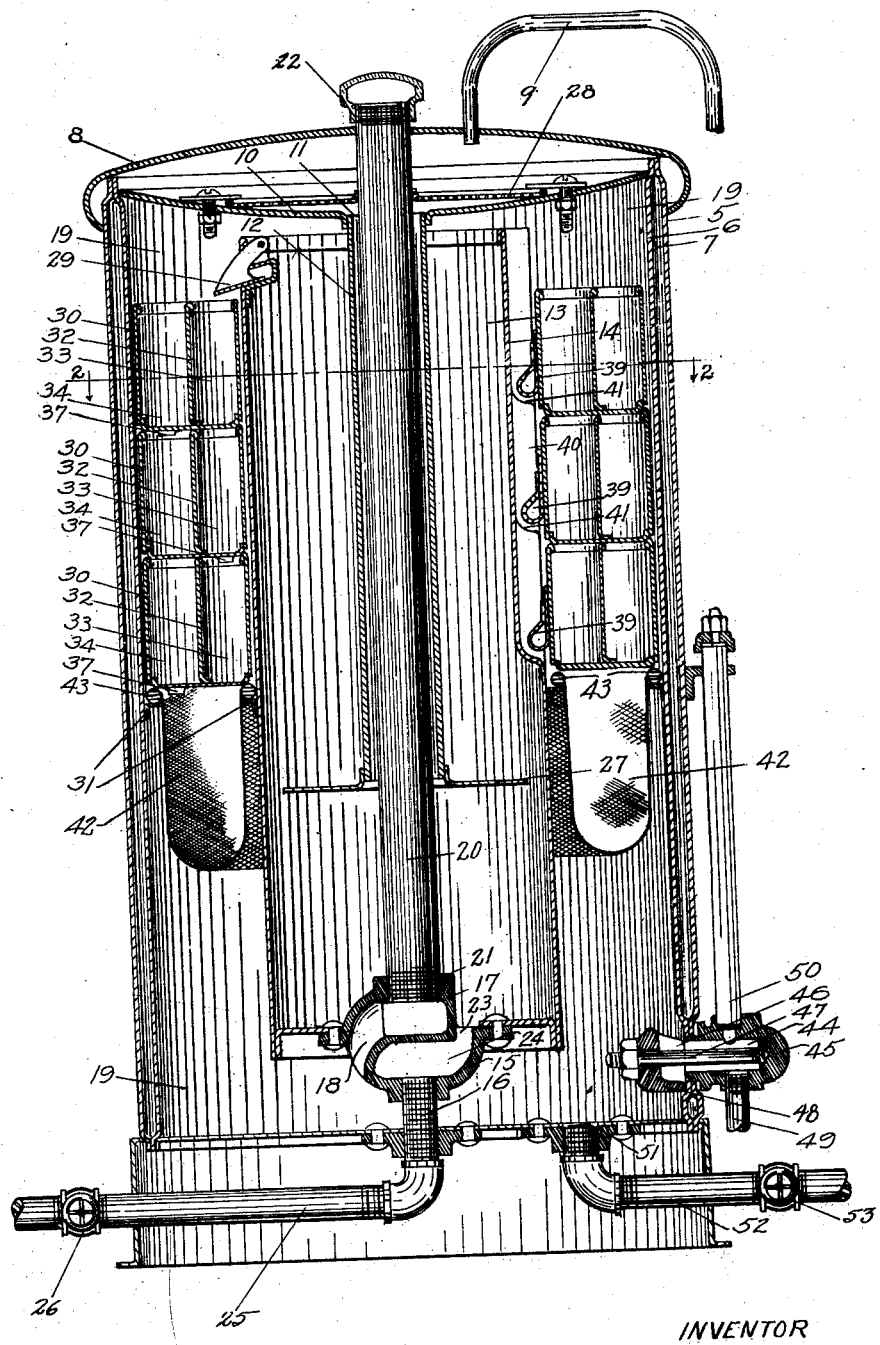
Figure 2:
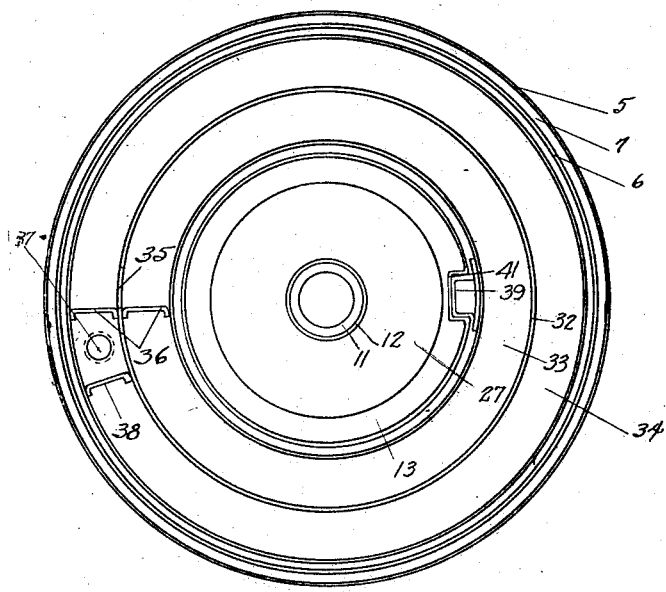
Figure 4:
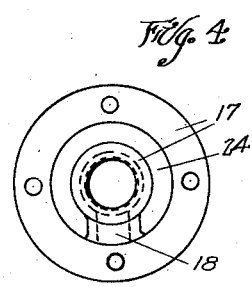
Figure 3:
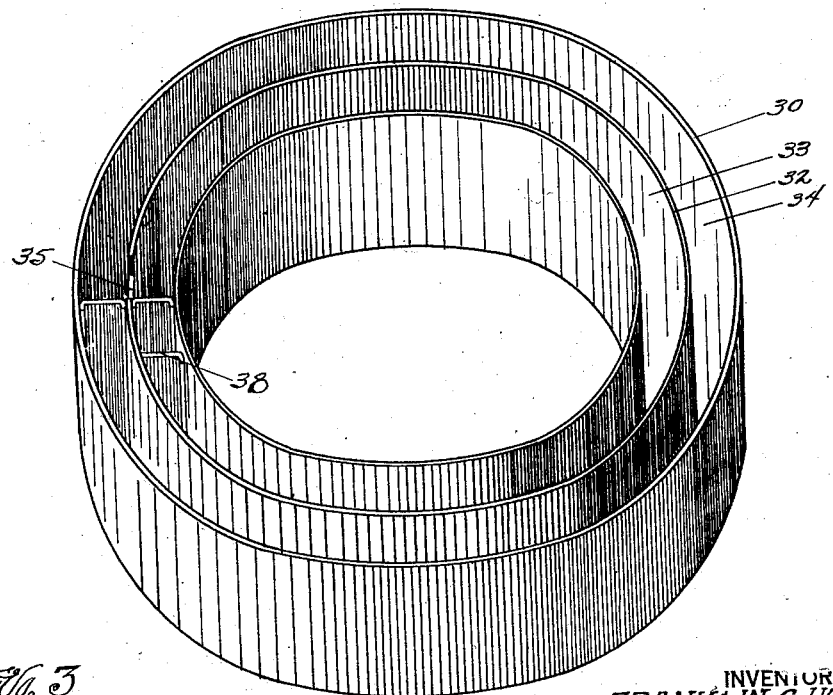

In the drawings Fig. 1 is a sectional elevation of an approved form of my invention; Fig. 2 is a sectional plan view taken along the line 2—2 in Fig. 1; Fig. 3 is an oblique view of an approved form of my precipitating tray; and Fig. 4 is a sectional view of a proposed form of fitting to take the clean oil filling pipe.

Referring by numerals to the drawings, 5 designates the outer wall of a container which may be of any desired size or shape, preferably cylindrical. This container preferably has an inner wall 6 forming a heating jacket 7 through which hot water, hot gases or the like, may be passed for the purpose of heating the contents of the container. The cover 8 for the container is preferably removable and has an opening through which the dirty oil inlet pipe 9 is passed. This pipe 9 is preferably so arranged that it may be swung out of the way to permit the removal of cover 8. A closure 10, preferably funnel shaped as shown, is preferably removably positioned on the top edge of container 5 and preferably has a central opening 11 to which is attached a pipe 12. This pipe 12 preferably projects downward into an inner compartment 13 formed by an inner container 14 positioned within the outer container 5 by means of fitting 15 and hollow threaded member 16. Fitting 15 is preferably bolted, riveted or otherwise suitably fastened to the bottom of container 14 so as to form an oil tight joint. This fitting preferably has a cup-shaped portion 17 with an outlet passage 18 leading into outer compartment 19 surrounding the inner compartment 13.

A clean-oil filling conduit 20 is preferably attached to the cup portion 17 as by the threading 21 and preferably projects up inside the pipe 12 and through the cover 8. A removable cap 22 may be provided for closing this conduit excepting when in use. Fitting 15 preferably has a passage 23 leading through it to outlet 24 through member 16, which member may be connected to an outlet pipe 25 having a suitable valve 26 therein. It will be seen from Fig. 1 that the passage 18 is separated from passage 23 by an imperforate partition, to prevent any possible admixture of oil in these passages, which are employed respectively for clean and dirty oil, as will hereinafter appear. A flange 27 is preferably provided attached to the bottom of pipe 12, and a strainer 28 is preferably removably attached to closure 10 above the opening 11. A spillway, or overflow outlet, 29 is preferably attached to inner container 14 substantially at its top and leading into outer compartment 19.

Immediately below the overflow outlet 29 and in the outer compartment 19 is preferably positioned the top one of a stack of precipitating trays 30. These trays may be positioned by means of lugs 31 securely attached to containers 5 and 14 respectively, and the trays stacked one on top of the other. The trays 30 preferably completely surround the inner compartment 13 and each has a central partition 32 forming, in each tray, an inner passageway 33 and an outer passageway 34. A spillway 35 serves as a communication between these passageways and transverse partitions 36 are preferably so placed as to cause the oil, in flowing through the trays, to traverse completely both passageways before flowing out of outlet opening 37 in the bottom of each tray. A transverse dam 38 is preferably provided to maintain a predetermined level of oil in each tray and the passageways are preferably relatively deep as shown. In order that the trays may be properly positioned with respect to the overflow outlet 29 and with respect to each other, I prefer to provide some means such as lugs 39 fastened to each of the trays 30 and adapted to fit into a recessed groove 40 in the container 14. By making the lugs 39 of different widths and the rests 41 in groove 40 of corresponding widths the trays may always be correctly positioned with respect to each other. For example, the lug 39 on the top tray could be made with the greatest width so that it could not pass down over the top one of the rests 41, whereas lug 39 of the middle tray could be made of an intermediate width so as to pass down past the top one of the rests but not to pass down over the middle rest. It will be understood that I do not limit myself to the use of any definite number of these trays as one or more may be employed depending upon the condition of the oil to be filtered.

Below the bottom one of the trays 30 is preferably positioned a filter bag 42 preferably attached to rings 43 resting on the lugs 31, so as to make the bag removable. This bag preferably surrounds the inner compartment 13. As a service outlet to the outer compartment 19, I prefer to employ a chamber 44 resident in fitting 45 and in communication with the compartment 19 by opening 46. This fitting may be attached by a bolt 47 and a clamp 48 which also acts as a baffle in front of opening 46. An outlet 49 from the chamber 44 preferably serves as the continuous service outlet and a standpipe gauge glass 50 is preferably placed in communication with the chamber 44 to serve as a clean oil gauge for chamber 19. A drainage outlet 51 may also be provided, connected to a pipe 52 in which is placed a suitable valve 53.

The operation of the filter is as follows: The dirty oil from inlet pipe 9 flows down through screen 28 which removes the coarser particles of foreign material. The oil then flows down to opening 11, out through pipe 12, around pipe 20, and into compartment 13 from around the edge of baffle 27 which serves to diffuse the oil throughout the compartment. Pipe 12 is attached by an oil-tight joint to the closure pan 10, and serves to deliver the raw oil, after it passes strainer 28, to a low point in the inner compartment 13, where heavy particles will sink to the bottom and from where the cleaner oil will rise and overflow at the top without admixture with dirty oil entering the filter. Any water or sludge in the oil will settle to the bottom of compartment 13 and may be withdrawn through passage 23 and outlet 24 by opening valve 26. The oil rises up through compartment 13 and is drained off near the top of that compartment by means of overflow drain or spillway 29. From the spillway 29 the oil drops down into the inner passageway 33 of the top one of the precipitating trays 30, flows over transverse dam 38, traverses the whole length of passage 33, flows over spillway 35 into outer passageway 34, traverses the whole length of this passageway, flows over transverse dam 38 and out through outlet opening 37 into the outer passageway of the second tray. It will be evident that the passage of the oil through this next tray will be in the reverse direction from that in the top tray and the outlet will be from the inner passageway, so that the flow of oil in alternate trays will be in the same direction. From the bottom tray the oil passes down through outlet 37 into filter bag 42 which is preferably of comparatively fine mesh for the purpose of removing the finer particles of foreign matter which did not settle out during the passage through the precipitating trays. The oil passes through the filter bag 42 into the bottom of clean oil compartment 19 and is preferably kept at a height somewhat below the top of the filter bag. The service outlet for this clean oil is over the baffle 48 through opening 46, into chamber 44 and out through pipe 49. It will be seen that while this outlet is adjacent the bottom of compartment 19 it does not drain that compartment completely, thus allowing some space for the settling of any material which may have passed through the trays and the filter bag. This material may be drawn out through the drainage opening 51 and pipe 52 by opening valve 53, and this opening also serves to drain completely the compartment 19 when it is desired to clean the filter. Pipe 20 serves as a means for replenishing the clean oil supply. The clean oil is poured in at the top of the pipe and flows down through opening 18 directly into the clean oil compartment 19. This feature enables new oil to be introduced in the system, from the top of the filter, and serves to prevent admixture of the fresh oil with unfiltered oil. This construction prevents contamination and dilution of the fresh oil, by adding it directly to the clean oil compartment 19. It will be seen that all of the parts are easily removable for cleaning purposes, the inner container 14 being removed by unscrewing member 16.

I claim:

1. In an oil filter, a container having an inner compartment and an outer compartment, an oil receiving container near the top of the filter, a conduit connected to the container and adapted to deliver, at a substantial depth in the inner compartment, the oil to be treated, and fluid conducting means associated with the bottom of the inner compartment, and extending outwardly beyond said compartment, forming an inlet to the outer compartment independent of direct fluid connection with said inner compartment.

2. In an oil filter, a container having an inner compartment and an outer compartment, a precipitating tray removably positioned in said outer compartment and surrounding said inner compartment, and a filter bag removably positioned below said tray and surrounding said inner compartment.

3. In an oil filter, a container having an inner compartment and an outer compartment, a removable closure for said container having a conduit depending therefrom into said inner compartment and forming a submerged inlet thereto, for the oil to be filtered, an oil conduit accessible exteriorly of the container and extended to constitute a direct, submerged inlet to the outer compartment, and an overflow outlet and a drainage outlet from said inner compartment.

4. In an oil filter, a container having an inner compartment and an outer compartment, a removable closure for said container having a conduit depending therefrom into said inner compartment and forming a submerged inlet thereto, and a conduit extending from without said container, through the inner compartment and means associated with said last named conduit, providing a submerged oil opening into said outer compartment.

5. In an oil filter, a container having an inner compartment and an outer compartment, a removable transverse partition in said container having a conduit depending therefrom into said inner compartment and forming a submerged inlet thereto, an element forming a drain passage from said inner compartment and having a passage therethrough separate from said drain leading into said outer compartment, a second conduit having its inlet beyond said partition, and its opposite end in said second named passage, and a drain outlet from said outer compartment.

6. In an oil filter, a container having an inner compartment and an outer compartment, the inner compartment being disposed above the bottom of the outer compartment, a removable transverse partition for said container having a conduit depending therefrom into said inner compartment and forming a submerged inlet thereto, a drainage outlet fitting in the bottom of said inner compartment and having an oil opening separate from the drain, into the outer compartment, means for supplying oil to said opening, independently of said conduit and compartment, an overflow outlet adjacent the top of said inner compartment, and an outlet from said outer compartment adjacent the bottom thereof.

7. In an oil filter having a clean oil compartment, a clean oil outlet fitting associated with a wall of said compartment, comprising a chamber, an opening from said chamber into the clean oil compartment of said filter, a baffle within said compartment in front of said opening, an outlet from said chamber, and a gauge connected to said chamber.

8. In an oil filter, the combination of a container having an inner compartment, an outer compartment and a heating jacket, a submerged inlet to said inner compartment, a drainage outlet in the bottom of said inner compartment and an overflow outlet adjacent the top of said inner compartment, a precipitating tray removably positioned within the outer compartment below said overflow outlet and surrounding the inner compartment, an outlet in the bottom of said tray, a filter bag removably positioned within the outer compartment and below said tray and an outlet from said outer compartment.

9. In an oil filter, a container having an inner compartment and an outer compartment and a heating jacket, a submerged inlet to said inner compartment, a drainage outlet in the bottom of said inner compartment and an overflow outlet adjacent the top of said inner compartment, a plurality of trays removably positioned in said outer compartment, one above the other, and surrounding the inner compartment, means for positioning said trays relative to the overflow outlet and relative to each other, an outlet in the bottom of each of said trays, a filter bag removably positioned in said outer compartment below the bottom one of the trays and surrounding the inner compartment, and a plurality of outlets from said outer compartment.

10. In an oil filter, a container having an inner compartment and an outer compartment and a heating jacket, a submerged inlet to said inner compartment, a drainage outlet in the bottom of said inner compartment and an overflow outlet adjacent the top of said inner compartment, a plurality of precipitation trays removably positioned in said outer compartment, one above the other, and surrounding the inner compartment, means for positioning said trays relative to the overflow outlet and relative to each other, an outlet in the bottom of each of said trays, a filter bag removably positioned in said outer compartment below the bottom one of the trays and surrounding the inner compartment, a drainage outlet in the bottom of said outer compartment, and a service outlet from said outer compartment adjacent the bottom thereof, a baffle positioned in front of said service outlet, a chamber connected to said service outlet, an outlet from said chamber and an oil gauge connected to said chamber.

11. An oil filter comprising a tank, a liquid receiving pan near the top thereof, a container mounted within the tank and spaced therefrom, a tube connected to the pan and adapted to deliver the liquid to be filtered, at a substantial depth in the container, a drain fitting extending through the bottom of the container and comprising a plurality of distinct oil passages, one thereof being adapted for the introduction of liquid into the space below and about the container, and a filler pipe having an opening accessible from without the tank, and leading into said oil introducing passage.

12. In a filter tank, a container within said tank for the liquid to be filtered, a fitting secured to the bottom of said container, drain and supply conduits connected to said fitting, the fitting having a plurality of separate passages and connections, one of said passages being adapted for drainage from the bottom of said container, and another of said passages being adapted for the introduction of liquid into a space below and surrounding said container, and without admixture of such liquid, with that to be drained from said container.

13. A filter tank having a plurality of openings in the bottom thereof, a connection in one of said openings, a container for dirty liquid adapted to be supported on said connection, said connection being adapted for the drainage of the contents of said container without admixture thereof with clean liquid in said filter tank.

14. In an oil filter, a container having a dirty oil chamber surrounded by a clean oil chamber, a fitting attached to one of said chambers, a clean oil supply pipe connected thereto, the fitting having a passage connecting with said pipe and adapted to conduct clean oil to said clean oil chamber, said fitting having a separate second passage adapted for the removal of dirty oil from said dirty oil chamber, and without admixture of the clean and dirty oil, and a drain pipe connecting with said second passage.

FRANKLIN G. HOBART.